(12) United States Patent
Goeller (10) Patent No.: US 11,158,354 B2
(45) Date of Patent: Oct. 26, 2021

(54) FOLDING HOLDER FOR AN EXTERNAL HARD DRIVE

(71) Applicant: Christian A. Goeller, Gilbert, AZ (US)

(72) Inventor: Christian A. Goeller, Gilbert, AZ (US)

( * ) Notice: Subject to any disclaimer, the term of this patent is extended or adjusted under 35 U.S.C. 154(b) by 28 days.

(21) Appl. No.: 16/796,259

(22) Filed: Feb. 20, 2020

(65) Prior Publication Data

US 2020/0279586 A1 Sep. 3, 2020

Related U.S. Application Data

(60) Provisional application No. 62/811,779, filed on Feb. 28, 2019.

(51) Int. Cl.
| | | |
|---|---|---|
| *G11B 33/02* | (2006.01) | |
| *G11B 33/04* | (2006.01) | |
| *G11B 33/12* | (2006.01) | |
| *G11B 25/04* | (2006.01) | |
| *G06F 1/16* | (2006.01) | |
| *G06F 1/18* | (2006.01) | |

(52) U.S. Cl.
CPC .......... *G11B 33/124* (2013.01); *G06F 1/1607* (2013.01); *G06F 1/1632* (2013.01); *G06F 1/18* (2013.01); *G11B 25/043* (2013.01); *G11B 33/025* (2013.01); *G11B 33/0494* (2013.01)

(58) Field of Classification Search
None
See application file for complete search history.

(56) References Cited

U.S. PATENT DOCUMENTS

| | | | |
|---|---|---|---|
| 5,253,133 A | 10/1993 | Guo | |
| 5,506,374 A * | 4/1996 | Kawakami et al. | G11B 33/121 |
| | | | 361/816 |
| 5,588,728 A | 12/1996 | Eldridge et al. | |
| 5,886,869 A | 3/1999 | Fussell et al. | |
| 6,724,621 B1 | 4/2004 | Liang | |
| 6,876,547 B2 | 4/2005 | McAlister | |
| 7,120,014 B2 | 10/2006 | Yang | |
| 8,854,766 B1 * | 10/2014 | Gustafson et al. | G11B 25/043 |
| | | | 360/97.12 |
| 8,995,119 B2 | 3/2015 | Thijssen et al. | |
| 9,099,163 B1 * | 8/2015 | Casey et al. | G11B 25/043 |
| 9,429,494 B1 * | 8/2016 | Gustafson | G01M 3/202 |
| 2005/0168929 A1 * | 8/2005 | Inoue et al. | G11B 33/12 |
| | | | 361/679.34 |
| 2005/0168935 A1 * | 8/2005 | Inoue et al. | G11B 33/124 |
| | | | 361/679.34 |
| 2006/0002005 A1 * | 1/2006 | Miyazaki et al. | G11B 33/124 |
| | | | 360/99.23 |
| 2007/0014086 A1 * | 1/2007 | Kim et al. | G11B 33/08 |
| | | | 361/679.36 |

(Continued)

FOREIGN PATENT DOCUMENTS

JP 2001148186 * 5/2001 ............. G11B 33/08

*Primary Examiner* — Craig A. Renner
(74) *Attorney, Agent, or Firm* — Mark V. Loen (57) ABSTRACT

The embodied invention is a bendable portable hard drive holder with four foldable arms, an adhering central element, a surface adhering element for attachment to a surface, and bendable metal in the 4 foldable arms. The invention is suited for portable use with a hard drive as the two adhering elements are separable, such as by use of a magnet or hook and loop attachment. The holder remains on the hard drive for improved convenience.

6 Claims, 6 Drawing Sheets

(56) References Cited

U.S. PATENT DOCUMENTS

2011/0212281 A1* 9/2011 Jacoby et al. ....... G11B 25/043
428/35.8
2016/0376473 A1* 12/2016 Furuta et al. ........ G11B 25/043
360/99.16

* cited by examiner

FOLDING HOLDER FOR AN EXTERNAL HARD DRIVE

CROSS REFERENCE TO RELATED APPLICATIONS

This application claims the benefit of U.S. Provisional Patent No. 62/811,779 filed on Feb. 28, 2019. The provisional application is incorporated in its entirety herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed toward computer accessories that provide certain enhancements when attaching a portable external hard drive to a laptop computer.

(2) Description of Related Art

Computers, especially laptops, utilize a permanent storage medium commonly called a 'hard drive.' The hard drive can be a spinning magnetic disk, or a solid state device that stores computer files and programs. Laptops typically have a hard drive storage located within an originally purchased case.

Computer users desire to have an additional 'external' hard drive storage medium for additional file storage. This also has the benefit to allow the user to store files separately from the laptop computer in an office or home setting. This provides improved security in case the laptop is lost, and expanded storage for files that are large or infrequently used.

It is well known that computer programs are stored in the laptop main operating system files, but specialized programs related to security and file operations, can be stored on an external hard drive that is not part of the laptop operating system. These programs can take up significant file storage space. Additionally, a number of programs utilize large files that are infrequently needed, such as high resolution video editing, for example.

Government Military personnel use external hard drives to manage secure information. The user may work with the files all day, and then put it in a safe for the night. The laptop will be available for other uses without worry that the secure files will not be misplaced or stolen. Similarly, certain government and medical personnel use an external hard drive and leave it at work for freedom to use the laptop at home for non-secure purposes.

Current use of an external hard drive is awkward, and often has to be placed near the computer. Cramped quarters require awkward placement of the external hard drive, and bent connecting cords are the result.

Additionally, external hard drives are used to back up files and then are stored when not needed.

What is needed in the market place is a solution that allows the user to add an external hard drive, swap external hard drives, and connect them to a computer with improved physical handling of the hard drive.

BRIEF SUMMARY OF THE INVENTION

The embodied invention is a bendable portable hard drive holder with four foldable arms, an adhering central element and a surface adhering element for a computer surface, and bendable metal in the four foldable arms. The invention is suited for portable use with a hard drive as the two adhering elements are separable, such as by use of a magnet or hook and loop attachment. Preferably, the hard drive remains inside the folding holder frame for improved convenience.

The embodied invention allows the external hard drive to conveniently connect to a computer communication port. The hard drive is encompassed by a flexible holder frame that folds and conforms to the shape of a variety of external hard drive case sizes. The holder frame is removably attached to the laptop by use of a hook and loop or magnetic connection.

DETAILED DESCRIPTION OF THE INVENTION

Figures 1, 2:
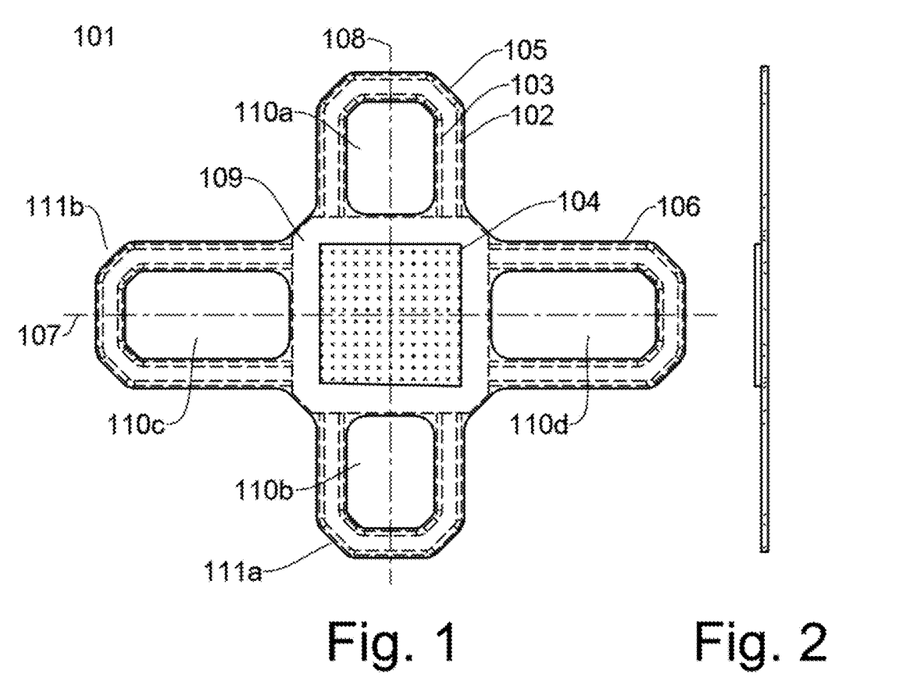
FIGS. 1-3 are different views of the folding holder frame.
Figure 5:
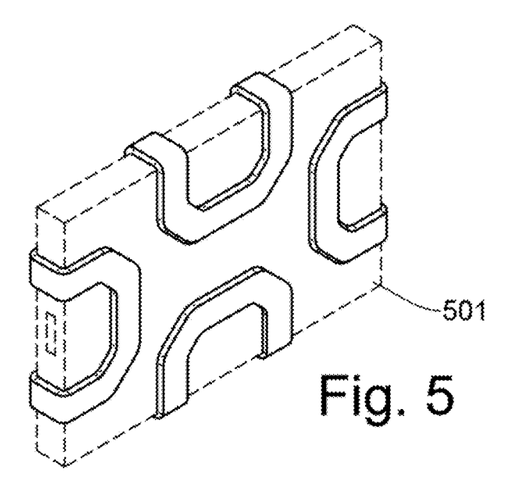
FIG. 5-6 show perspective views when the drive holder frame is folded around a portable hard disk drive.
Figure 6:
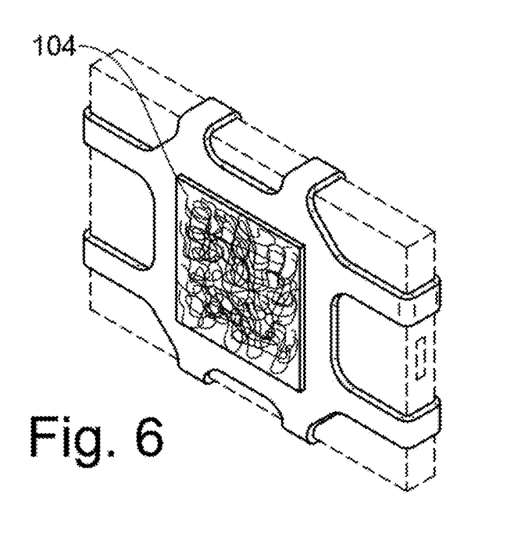

The conceived embodiments of the invention are designed to address the needs as mentioned in previous paragraphs for security, convenience, and FIG. 1 shows the folding holder frame 101 made up of four foldable arms, symmetrically oriented about the center horizontal 107 and vertical 108 axis, that are attached to a central connecting area 109. The holder frame is flat when unfolded, and about 1 to 3 mm in thickness. A shorter foldable arm 105 and a longer foldable arm 106 are used to hold an external hard drive that is rectangular (as shown in FIGS. 5 and 6) or square in shape. The four foldable arms are connected to a center area that is substantially rectangular in shape. In FIG. 1, the four foldable arms have chamfered corners 111$a,b$ to allow the foldable arms to conveniently bend. The chamfered corners are preferred, but a rectangular shaped folding arm without chamfered corners is an alternate embodiment. Rectangular shaped cutouts 110$a,b,c,d$ in the rectangular arms lighten the weight and make bending the arms easier.

When describing the folding arms, cutout areas, or the central area as rectangular or substantially rectangular, it is meant to include rounded or chamfered corners.

Embedded metal wires 102,103 are included in the folding arms and provide the ability for the folding holder frame to bend and unbend. The metal wire is preferably a steel or aluminum, with an alloy that allows multiple bending cycles without failure. An embedded thin center plate covers and stiffens the central connecting area 109.

The folding holder frame includes a frame attaching element 104 that is bonded to the central connecting area 109 and connects to a similar computer attaching element (see FIG. 4) that is similarly bonded to a computer surface. The connection between the two attaching elements is firm, but easily separable.

Figure 3:
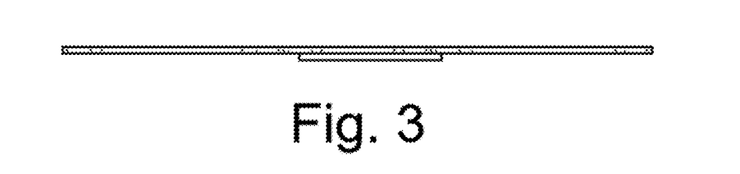

FIGS. 2 and 3 are right and upper edge views of FIG. 1, respectively.

Overall, the thickness of the HDD holder is between 4 and 5 mm thick, when including the attaching element. The center plate is between 1 and 1.5 mm thick and then a layer of about 1.5 mm thick of silicone on either side of the center plate. The frame attaching element is preferably between 1 and 3 mm thick. The outside dimensions are about 200 mm wide and about 180 mm tall.

Figure 4:
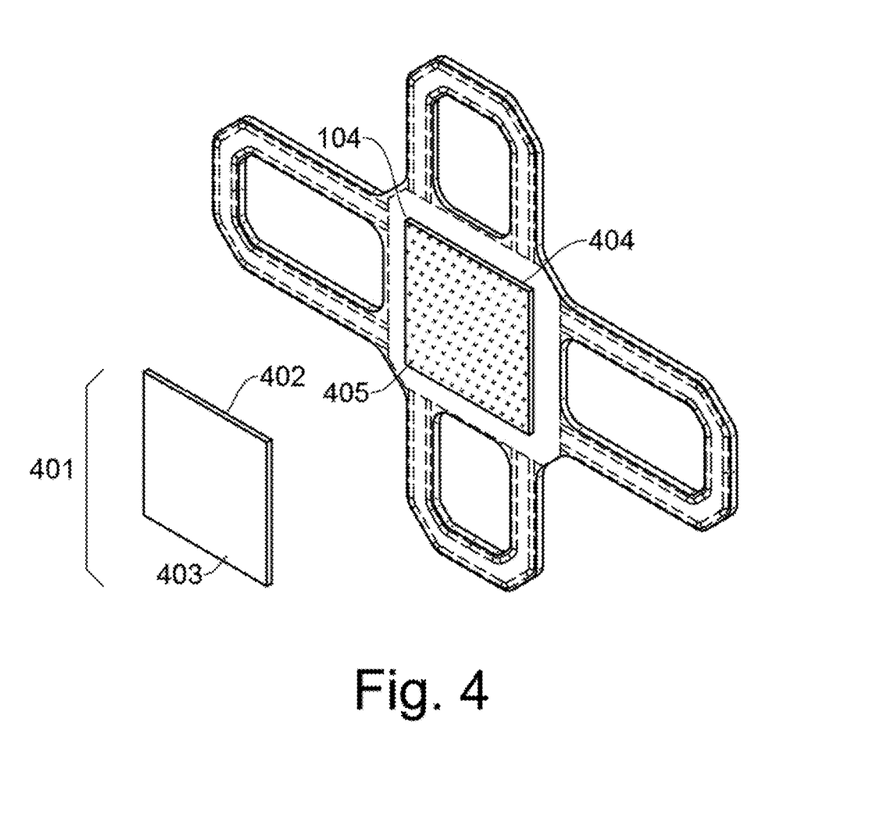
FIG. 4 shows a perspective view with an additional computer attaching element.

FIG. 4 shows the holder frame in perspective view and a better view of the frame attaching element 104. The frame attaching element includes an adhesive 404 on the nonvisible side adjacent to the holder frame, and a gripping surface 405. The gripping surface is preferably magnetic or part of a Velcro (hook and loop connection).

The surface attaching element 401 works similarly with an adhesive layer 403 and a gripping layer 402. The surface attaching element is adhesively bonded to the computer surface.

FIGS. 5 and 6 show how the folding holder frame is bent to encompass a rectangular shaped external hard drive 501. FIG. 6 shows the frame attaching element 104.

The frame attaching element 104 and the surface attaching element 401 work together to provide the ability for the hard drive to be conveniently removeable. The hook and loop/magnetic method is preferably used for separating the hard drive holder from the computer or a magnet/metal pair. Other methods could be equally employed.

Figure 7:
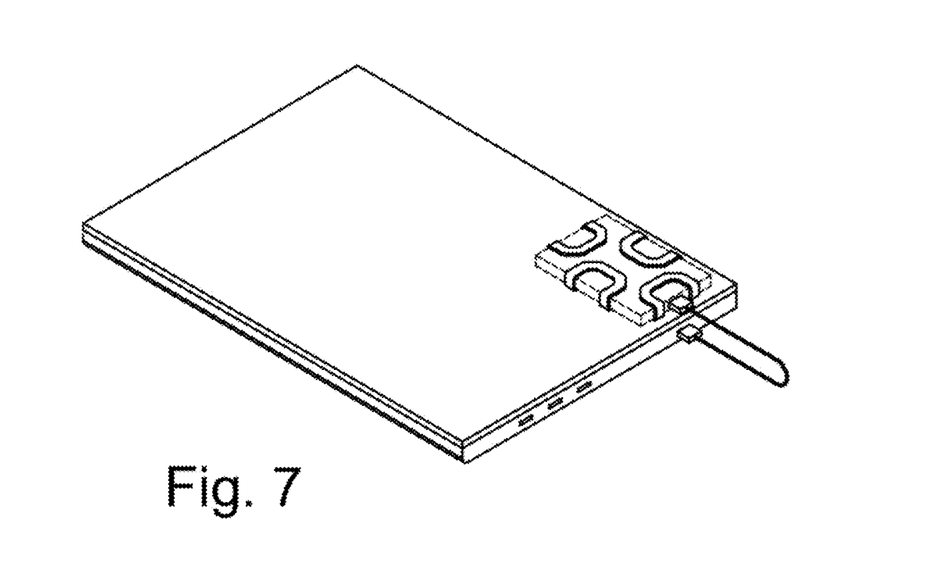
FIGS. 7-8 shows the embodied invention showing how a typical external hard drive will be attached to the laptop top cover or a desktop tower case.
Figure 8:
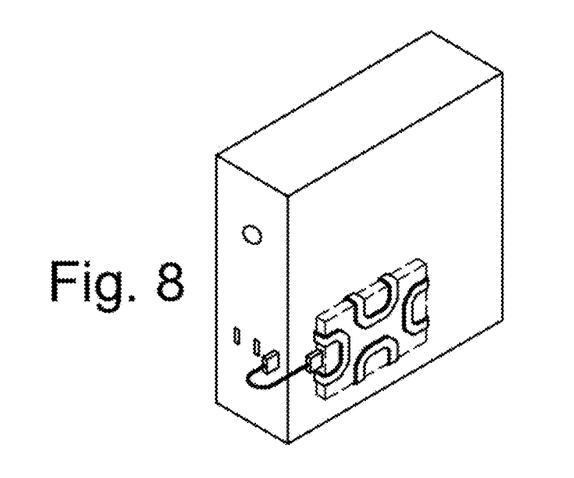

FIGS. 7 and 8 show the invention when an external hard drive is connected to a laptop computer As seen, the four arms of the folding holder frame are bent to firmly and securely hold the external hard drive. The external hard drive is preferably connected to a computer communication port such as a USB to avoid the need for a separate power cord.

Similarly, FIG. 8 shows the embodied invention connected to a desktop tower case.

Figure 9:
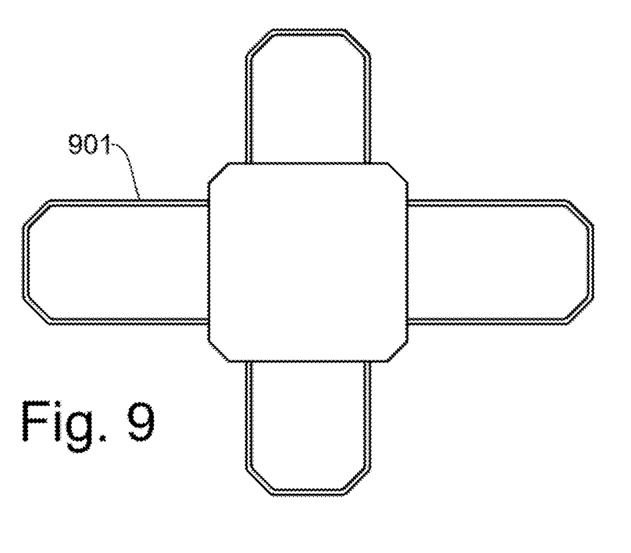
FIGS. 9-10 show alternate embedded stiffening wireframes.
Figure 10:
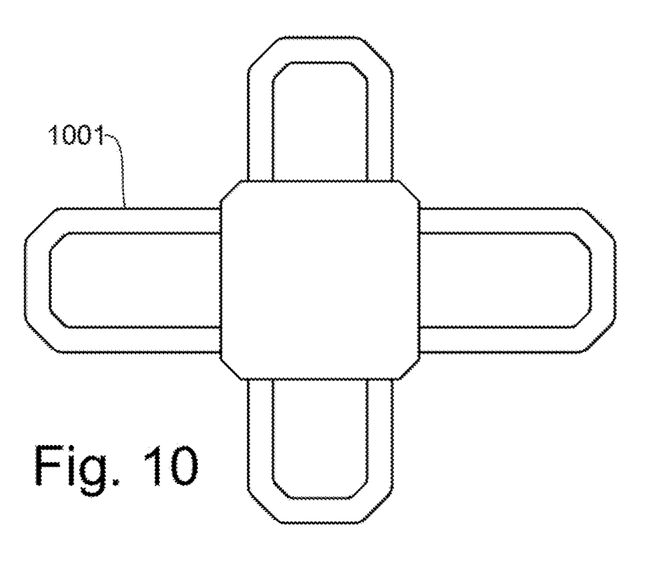

In alternate embodiments, FIG. 9 shows a single wire 901 that is looped to provide stiffness to the folding arms. And FIG. 10 shows a thin flat plate 1001 that provides stiffness to the folding arms.

Figure 11:
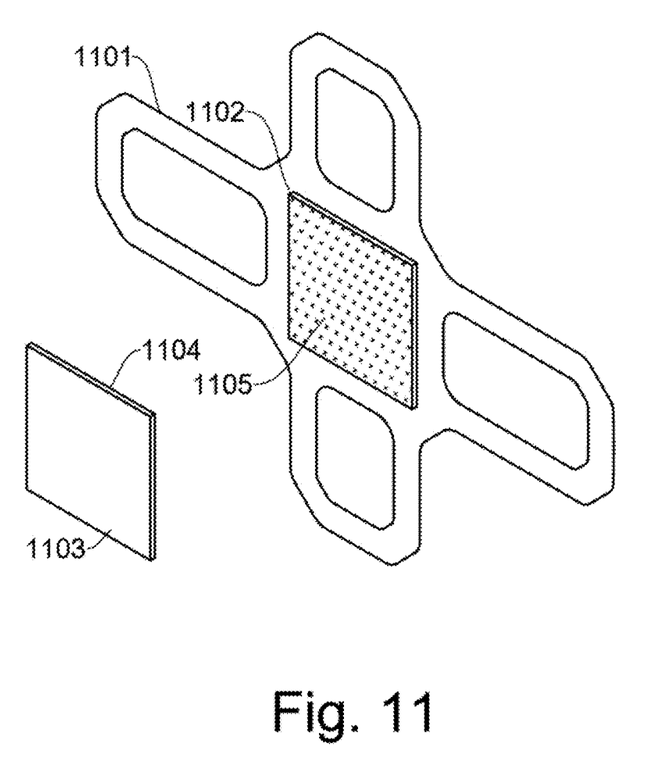
FIG. 11 shows an alternate embodiment of the invention by utilizing a thin metal frame with bendable metal.

FIG. 11 shows an alternate embodiment where a bendable, thin metal is stamped into the HDD folding shape 1101. It is preferably surface coated with a flexible thin paint or a bonded polymer coating. The metal, such as aluminum, is about 0.1-1.0 mm thick and is made from an alloy that will withstand repeated bending and unbending. It includes attaching element 1102 which is adhered to the frame, and a matching attachment 1103 which is bonded to the computer surface. The surfaces 1104, 1105 of the attaching elements provide a temporary connection.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A computer accessory suitable for temporarily holding an external computer hard drive on an external computer surface comprising:
   a. a flat folding holder frame further comprising:
      i. a central attaching surface that is substantially rectangularly shaped,
      ii. two horizontal folding arms that are substantially rectangularly shaped, a proximal end of each said horizontal folding arm is connected to an opposite side of said central attaching surface,
      iii. two vertical folding arms that are substantially rectangularly shaped, a proximal end of each said vertical folding arm is connected to an opposite side of said central attaching surface, and
      iv. all said folding arms include an embedded wireframe,
   b. said folding holder frame is between 1 and 3 mm in thickness inclusive,
   c. a frame connecting element that is bonded to said central attaching surface,
   d. a computer connecting element that is bonded to a computer surface, and
   e. said frame connecting element and said computer connecting element are temporarily joinable by either:
      i. a magnetic connection, or
      ii. a hook and loop connection,
   f. whereby said external computer hard drive is secured to said external computer surface when:
      i. said horizontal folding arms and said vertical folding arms are bent around said external computer hard drive, and
      ii. said frame connecting element is joined to said computer connecting element.

2. The computer accessory according to claim 1, said horizontal folding arms are symmetric with respect to said central attaching surface, and said vertical folding arms are symmetric with respect to said central attaching surface.

3. The computer accessory according to claim 2, wherein all said folding arms include a cutout.

4. A computer accessory suitable for temporarily holding an external computer hard drive on an external computer surface comprising:
   g. a flat folding holder frame further comprising:
      i. a central attaching surface that is substantially rectangularly shaped,
      ii. two horizontal folding arms that are substantially rectangularly shaped, a proximal end of each said horizontal folding arm connected to an opposite side of said central attaching surface,
      iii. two vertical folding arms that are substantially rectangularly shaped, a proximal end of each said vertical folding arm connected to an opposite side of said central attaching surface,
   h. said folding holder frame is between 0.1 and 1 mm in thickness inclusive,
   i. a frame connecting element that is bonded to said central attaching surface,
   j. a computer connecting element that is bonded to a computer surface, and
   k. said frame connecting element and said computer connecting element are temporarily joinable by either:
      i. a magnetic connection, or
      ii. a hook and loop connection,
   l. whereby said external computer hard drive is secured to said external computer surface when:

i. said horizontal folding arms and said vertical folding arms are bent around said external computer hard drive, and
ii. said frame connecting element is joined to said computer connecting element.

5. The computer accessory according to claim 4, said horizontal folding arms are symmetric with respect to said central attaching surface, and said vertical folding arms are symmetric with respect to said central attaching surface.

6. The computer accessory according to claim 5, wherein all said folding arms include a cutout.

* * * * *